US010179256B2

(12) United States Patent
Stephens

(10) Patent No.: US 10,179,256 B2
(45) Date of Patent: Jan. 15, 2019

(54) FIRE PUMP ROOM SYSTEM INTEGRATOR

(71) Applicant: Douglas A. Stephens, Cary, NC (US)

(72) Inventor: Douglas A. Stephens, Cary, NC (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 910 days.

(21) Appl. No.: 14/204,974

(22) Filed: Mar. 11, 2014

(65) Prior Publication Data

US 2014/0303794 A1 Oct. 9, 2014

Related U.S. Application Data

(60) Provisional application No. 61/779,542, filed on Mar. 13, 2013.

(51) Int. Cl.
*G05D 7/06* (2006.01)
*A62C 37/00* (2006.01)

(52) U.S. Cl.
CPC .................................... *A62C 37/00* (2013.01)

(58) Field of Classification Search
CPC ...................................................... A62C 37/00
See application file for complete search history.

(56) References Cited

U.S. PATENT DOCUMENTS

| | | | | |
|---|---|---|---|---|
| 3,748,656 | A | 7/1973 | Gray et al. | |
| 5,035,357 | A | 7/1991 | Brickell et al. | |
| 5,236,049 | A | 8/1993 | Asselin et al. | |
| 5,460,196 | A | 10/1995 | Yonnet | |
| 5,577,890 | A | 11/1996 | Nielsen et al. | |
| 5,680,329 | A * | 10/1997 | Lloyd ................... | A62C 37/50 137/551 |
| 5,729,698 | A | 3/1998 | Stelter | |

(Continued)

FOREIGN PATENT DOCUMENTS

| | | | | |
|---|---|---|---|---|
| CN | 201402401 | Y * | 2/2010 | |
| EP | 1702655 | A1 | 9/2006 | |
| JP | 2009008091 | A1 | 1/2009 | |

OTHER PUBLICATIONS

Firetrol, Inc., Instructions, Digital Pressure Monitor, FTA470, Publication NS470-01 Rev. A (Oct. 20, 2000).

(Continued)

*Primary Examiner* — Kenneth M Lo
*Assistant Examiner* — David J Wynne
(74) *Attorney, Agent, or Firm* — McDonnell Boehnen Hulbert & Berghoff LLP

(57) ABSTRACT

An example system in a fire pump room may comprise a monitoring component that is configured to receive data from two or more pump room devices of a fire pump room. The monitoring component may include a plurality of input ports and each of the two or more pump room devices may be communicatively coupled to the monitoring component via a corresponding input port. The system may further comprise a wireless network interface controller communicatively coupled to a server in a network via a wireless access point, and a memory configured to store subscription information for one or more subscribing parties. Additionally, the system may comprise a processing component configured to send an indication of the received data to at least one of the one or more subscribing parties via the wireless network interface controller.

16 Claims, 7 Drawing Sheets

(56) References Cited

U.S. PATENT DOCUMENTS

| | | | | |
|---|---|---|---|---|
| 5,950,150 | A | 9/1999 | Lloyd et al. | |
| 5,982,274 | A | 11/1999 | Stelter et al. | |
| 6,221,263 | B1 | 4/2001 | Pope et al. | |
| 6,266,713 | B1 * | 7/2001 | Karanam | G05B 19/042 710/9 |
| 6,273,686 | B1 | 8/2001 | Kroell et al. | |
| 6,856,251 | B1 | 2/2005 | Tietsworth et al. | |
| 6,992,590 | B1 | 1/2006 | Tietsworth et al. | |
| 8,224,499 | B1 * | 7/2012 | Jarrett, Jr. | G05B 19/0428 701/1 |
| 2005/0183868 | A1 | 8/2005 | Taylor et al. | |
| 2005/0278409 | A1 * | 12/2005 | Kutzik | G08B 21/0423 709/200 |
| 2010/0100902 | A1 * | 4/2010 | Kaga | H04N 5/44513 725/37 |
| 2010/0138054 | A1 | 6/2010 | Goupil | |
| 2012/0010831 | A1 * | 1/2012 | Kagan | G01D 4/004 702/60 |
| 2012/0132445 | A1 * | 5/2012 | Mallon | A62C 27/00 169/24 |
| 2012/0239221 | A1 * | 9/2012 | Mighdoll | F24F 11/0012 700/300 |
| 2013/0077534 | A1 * | 3/2013 | Hu | H04L 41/5054 370/259 |

OTHER PUBLICATIONS

Torna Tech, JP Model, JOckey Pump Controller, Full voltage across the line starter Mico Processor Based, JP-BRO-001/E Rev.4 (Sep. 4, 2003).

U.S. Appl. No. 12/626,781, Office Action dated Sep. 30, 2011 (Sep. 30, 2011).

U.S. Appl. No. 12/626,781, Office Action dated Jun. 8, 2012 (Jun. 8, 2012).

* cited by examiner

FIRE PUMP ROOM SYSTEM INTEGRATOR

BACKGROUND

A fire protection system may comprise a sprinkler system and/or a standpipe system. A sprinkler system is an active fire protection measure that provides adequate pressure and flow to a water distribution piping system, onto which a plurality of fire sprinklers is connected. Each closed-head sprinkler can be triggered once an ambient temperature around the sprinkler reaches a design activation temperature of the individual sprinkler head. In a standard wet-pipe sprinkler system, each sprinkler activates independently when the predetermined heat level is reached. Because of this, the number of sprinklers that operate is limited to only those near the fire, thereby maximizing the available water pressure over the point of fire origin.

A standpipe system is another type of fire protection measure consisting of a network of vertical piping installed in strategic locations within a multi-story building. The vertical piping may deliver large volumes of water to any floor of the building to supply hose lines of firefighters, for example.

In order to provide water flow at a high pressure to a fire protection system, a fire pump may be installed within a fire pump room of a building. Generally, fire pumps are needed when a water source cannot provide sufficient pressure to meet hydraulic design requirements of a fire protection system. This usually occurs in a building that is tall, such as a high-rise building, or in a building that requires a relatively high terminal pressure in the fire protection system to provide a large volume of water, such as a storage warehouse. In one example, a fire pump may start when a pressure in a fire protection system drops below a certain predetermined start pressure. For example, the pressure in the fire protection system may drop significantly when one or more fire sprinklers are exposed to heat above their design temperature, and open, releasing water. Alternately, fire hose connections to standpipe systems may be opened by firefighters causing a pressure drop in the fire protection system.

Operation of the fire pump may be controlled by a fire pump controller that is located in the vicinity of the fire pump room. For example, the fire pump controller may be a microprocessor-based controller that automatically causes the fire pump to start when a water pressure is below a pressure set point. The fire pump may be powered by an electric motor, a diesel engine, or a steam turbine that is also located in the vicinity of a fire pump room. In addition to the fire pump and fire pump controller, the fire pump room may include other pump room devices associated with regulation or control of the fire protection system. Example pump room devices include a jockey pump, a jockey pump controller, an emergency generator, and a power transfer switch, among other possible devices.

SUMMARY

In one example aspect, a system in a fire pump room is provided. The system comprises a monitoring component that is configured to receive data from two or more pump room devices of the fire pump room. The monitoring component comprises a plurality of input ports and each of the two or more pump room devices is communicatively coupled to the monitoring component via a corresponding input port. The system further comprises a wireless network interface controller communicatively coupled to a server in a network via a wireless access point. The system also comprises a memory configured to store subscription information for one or more subscribing parties. Additionally, the system comprises a processing component configured to send an indication of the received data to at least one of the one or more subscribing parties via the wireless network interface controller.

In another example aspect, a method performed by a system in a fire pump room is provided. The method comprises receiving, from each of two or more pump room devices of the fire pump room, data indicative of a status of the pump room device. Each of the two or more pump room devices is configured to provide data to the system via a corresponding input port with which the pump room device is communicatively coupled. The method further comprises identifying one or more subscribing parties based on subscription information of a subscription database. The method also comprises providing an indication of the received data to at least one of the identified subscribing parties via a wireless network interface controller of the system that is communicatively coupled to a server in a network.

In another example aspect, a non-transitory computer-readable medium is provided that has stored therein instructions, that when executed by a system in a fire pump room, cause the system to perform functions. The functions comprise receiving, from each of two or more pump room devices of the fire pump room, data indicative of a status of the pump room device. Each of the two or more pump room devices is configured to provide data to the system via a corresponding input port with which the pump room device is communicatively coupled. The functions further comprise identifying one or more subscribing parties based on subscription information of a subscription database. The functions also comprises providing an indication of the received data to at least one of the identified subscribing parties via a wireless network interface controller of the system that is communicatively coupled to a server in a network.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
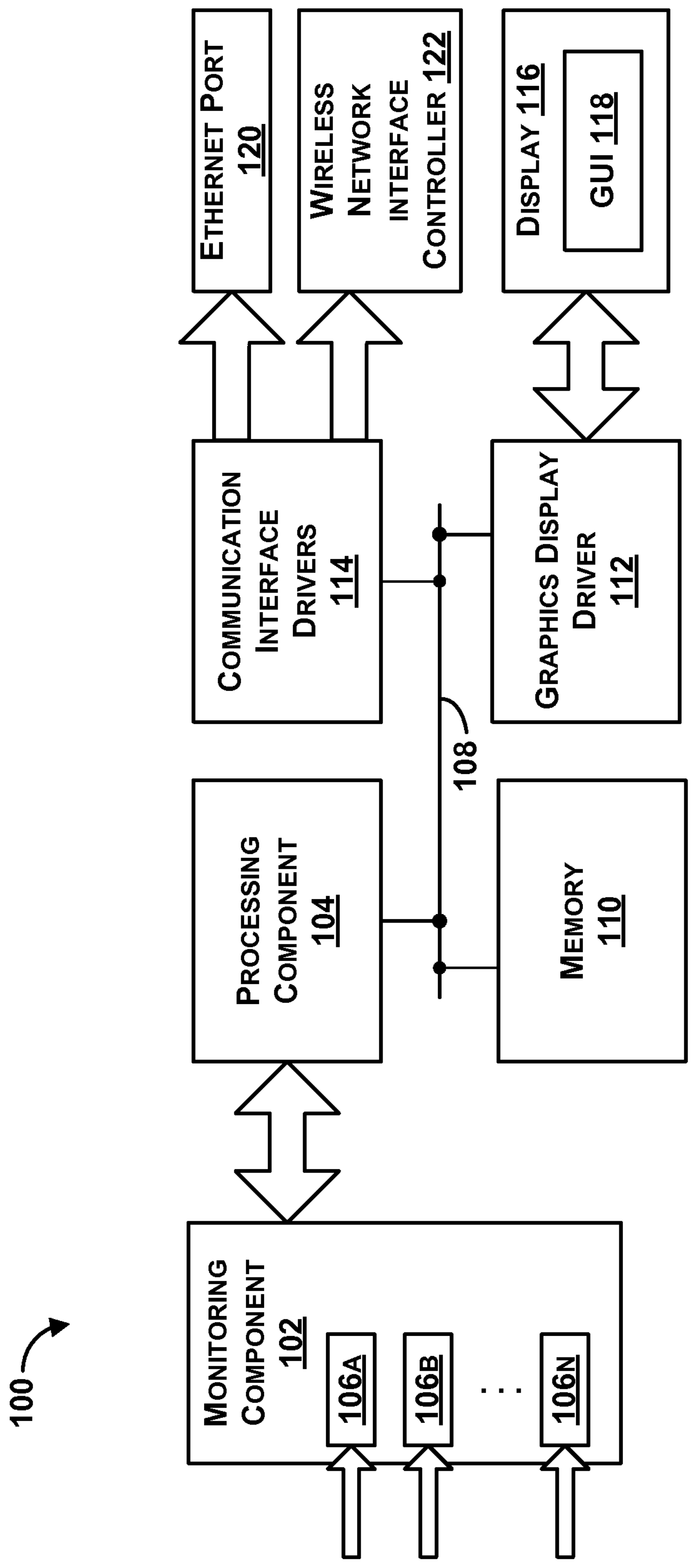
FIG. 1 is a block diagram illustrating an example system in a fire pump room.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example devices, systems, and methods disclosed herein relate to a system in a fire pump room that is configured to monitor information from multiple pump room devices and provide the information to one or more external parties. An example system may comprise a monitoring component configured to receive data from two or more pump room devices of the fire pump room. Example pump room devices may include fire pump controllers, jockey pump controllers, diesel engines, and automatic power transfer switches, among other pump room devices. Each of the two or more pump room devices may be communicatively coupled to the monitoring component via a corresponding input port. For example, pump room devices may be communicatively coupled to an input port via a wired communication link (e.g., a Modbus communication link) or a wireless communication link (e.g., a Wi-Fi communication link).

The example system may also comprise a processing component configured to send an indication of the received data to one or more subscribing parties. For instance, an indication of the received data may be provided through a Wi-Fi cloud service and/or via an Ethernet port. In one example, the Ethernet port may support building management system interfaces such as BACnet and Profinet. In another example, the Wi-Fi cloud service may be provided as a private cloud for subscribing parties.

In some examples, the example system may be installed in the local vicinity of a fire pump room. For instance, the system may facilitate gathering information from life safety equipment in the fire pump room and providing the information to external parties. The external parties may then be able to monitor the status of the life safety equipment in the fire pump room.

In other examples, the example system may include one or more additional components and/or features as will be further described below with reference to FIGS. 1-5. Therefore, the example system should not be taken to be limiting.

Referring now to the figures, FIG. 1 is a block diagram illustrating an example system 100 in a fire pump room. In some examples, the system 100 may include one or more functional or physical components, such as a processing component 104 and a monitoring component 102. One or more of the described functional or physical components may be divided into additional functional or physical components, or combined into fewer functional or physical components. Additionally, the system 100 may include more or less functional and/or physical components.

The monitoring component 102 may be a communication interface that is configured to receive data from multiple pump room devices via multiple input ports 106A-106N. The input ports 106A-106N may include one or any combination of serial communication ports and parallel communication ports. For instance, any of the input ports 106A-106N may include any type of Modbus serial communication port (e.g., Modbus RS485) or Modbus over Ethernet port.

In another example, the input ports 106A-106N may include a pressure port configured to receive a signal from a pressure transducer. For instance, the pressure transducer may provide data indicative of a water pressure in a portion of a fire protection system. In still another example, the input ports 106A-106N may include an engine instrument port configured to receive a signal from an engine instrument. Example engine instruments may include an oil pressure sensor, a temperature sensor, or a tachometer, among other possible engine instruments configured to monitor an engine. In yet another example, the input ports 106A-106N may include a wireless network controller configured to receive a wireless signal. In still another example, input ports 106A-106N may include an analog or digital video connector configured to receive a signal from a video camera. Generally, the input ports 106A-106N may include any type of wired or wireless port configured to receive a digital and/or analog signal.

The processing component 104 may be configured to receive electrical signals from the monitoring component 102. Functions of the processing component 104 may be performed by any type of processor such as a microprocessor, microcontroller, digital signal processor, or any combination thereof. Additionally, the processing component 104 may include one or more levels of caching, a processor core, and registers. The processor core can include an arithmetic logic unit, a floating point unit, a digital signal processing core, or any combination thereof. In one example, the processing component 104 may comprise a TMS470-based microcontroller. In some examples, the functions of the processing component 104 may be provided by multiple microprocessors.

The processing component 104 may be coupled to additional components of the system 100 via a connection mechanism 108. In one example, the connection mechanism may be a computing bus. The computing bus may include any type of subsystem configured to transfer data between components. In another example, the connection mechanism 108 may be an electronic circuit board. For instance, the processing component 104 may be connected to an electronic circuit board that other components of the system 100 are also connected to. Optionally, the electronic circuit board may further be connected to an input/output (I/O) expansion board. For instance, a ribbon cable may connect the electronic circuit board to the I/O expansion board.

In one example configuration, the processing component may be coupled to a memory 110, a graphics display driver 112, and one or more communication interface drivers 114. The memory 110 may include any type of memory such as for example, volatile memory (e.g., random access memory), non-volatile memory (e.g., read only memory, flash memory, etc.) or any combination thereof. The memory 110 may include stored software applications and/or databases, and the processing component 104 or other components of the system 100 may be configured to access the memory 110 and execute one or more of the software applications stored therein or read/write data of the databases stored therein. In one example, the memory 110 may store a subscription database having subscription information for one or more subscribing parties.

The graphics display driver 112 may be configured to drive a display 116 of the system 100 or an external display for a PC, laptop, video monitor, television, or similar monitor device. Such displays may be provided locally at a location of the system 100 or remotely. In one instance, the display 116 may be configured to provide a graphical user interface 118. The graphical user interface 118 may be configured to receive various user inputs. For instance, a user may utilize the graphical user interface 118 to add a pump room device to be monitored by the system 100, modify a configuration of a pump room device that is being monitored, name a Modbus register, modify a preferred Modbus register list, or perform other functions.

The one or more communication interface drivers 114 may facilitate communication between components of the system 100, communication between the system 100 and one or more devices of the fire pump room, and/or communication with one or more external parties. For instance, the system 100 may communicate using a Modbus driver or a controller area network (CAN) bus driver, or other communication interface driver. Other communication interface drivers may also provide for communication using Modbus Ethernet, CANOpen, wired or wireless Ethernet, DeviceNet, ProfiBus, BACNet, ARCNet, ZigBee, Bluetooth, Wi-Fi, and other similar protocol structures.

In one example, the processing component 104 may be configured to provide an indication of data that is received by the monitoring component 102 to one or more subscribing parties based on subscription information for the subscribing parties that is stored in a database of the memory 110 and accessible by the processing component 104. In one example, subscription information for a given subscribing party may include one or more of an identification of the subscribing party, a communication type (e.g., Ethernet, wireless via Wi-Fi cloud service, etc.), and a notification frequency (e.g., how often to provide data to the subscribing party).

In one instance, based on subscription information for a subscribing party, the processing component may be configured to provide an indication of data that is received by the monitoring component 102 to the subscribing party via an Ethernet port 120. For instance, the Ethernet port may facilitate local building management system interfacing via BACNet or Profinet protocols.

In another instance, based on subscription information for a subscribing party, the processing component may be configured to provide an indication of data that is received by the monitoring component 102 to the subscribing party via a wireless network controller 122. For example, the wireless network interface controller 122 may be coupled to a server in a network via a wireless access point. In one instance, the wireless access point may include a wireless router that is coupled to a wired network (e.g., the Internet), or the wireless access point may be configured to connect to a wireless router. The wireless network interface controller 122 may utilize any type of wireless protocol such as Wi-Fi, Wireless Application Protocol (WAP), Bluetooth, etc. In another instance, the wireless network interface controller 122 may include a wireless modem which utilizes a cellular communication system to communicate with a wired network. For example, the wireless modem may be configured to communicate using GPRS, UMTS, HSPA, EVDO, WiMax, LTE, or other cellular communication protocols.

Figure 2:
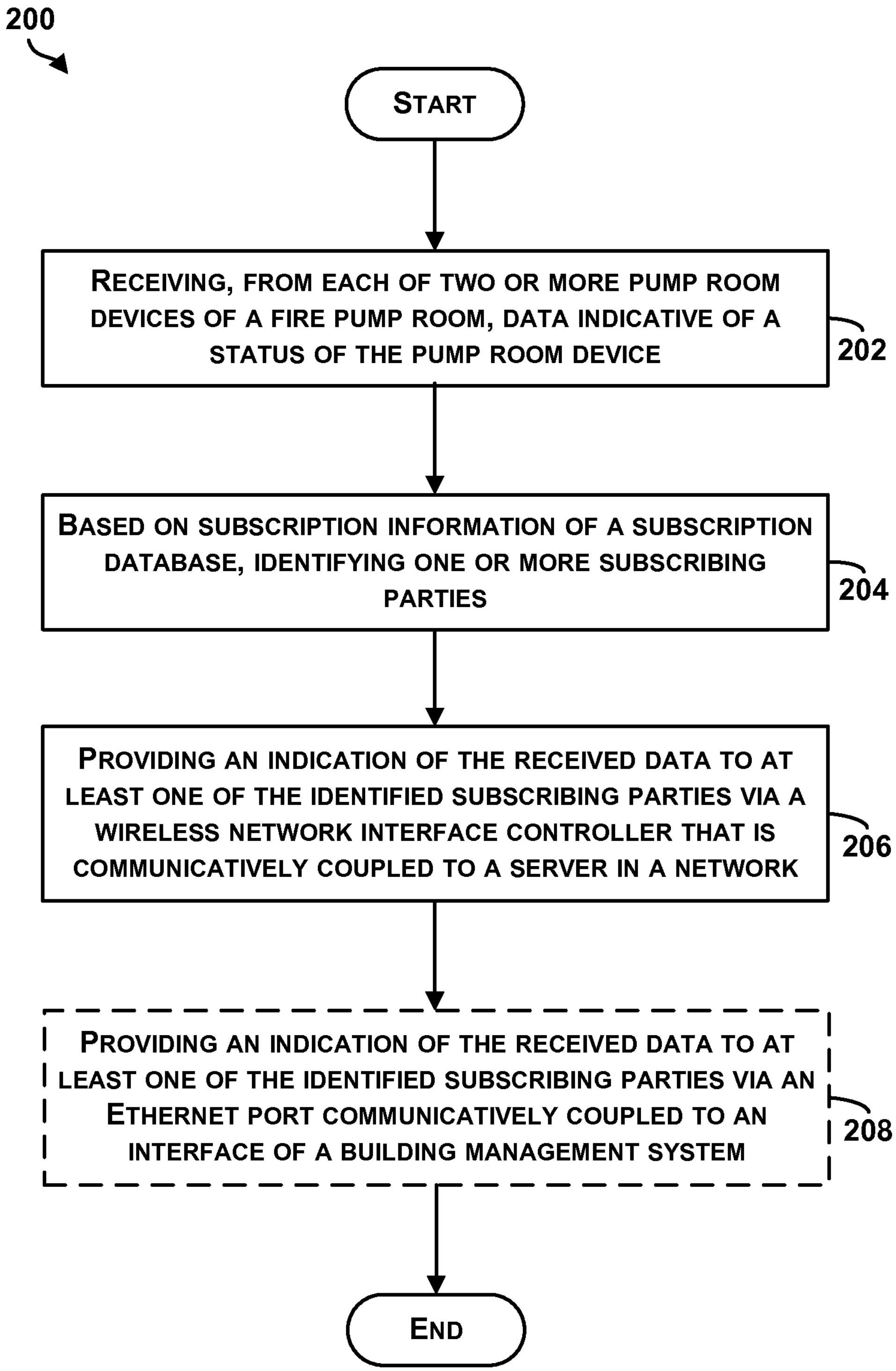
FIG. 2 is a flow chart of an example method performed by a system in a fire pump MOM.

FIG. 2 is a flow chart of an example method 200 performed by a system in a fire pump room. Method 200 shown in FIG. 2 presents an embodiment of a method that could be performed by the system 100 of FIG. 1 or one or more components of the system 100, for example, or generally by any computing device. It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Initially, as shown at block 202, the method 200 includes receiving, from each of two or more pump room devices of a fire pump room, data indicative of a status of the pump room device. Each of the two or more pump room devices may be configured to provide data via a corresponding input port with which the pump room device is communicatively coupled. The two or more pump room devices may include devices such as fire pump controllers, jockey pump controllers, diesel engines, electric motors, automatic power transfer switches, fuel tank meters, test loop flow meters, battery backup systems, thermostats, or video cameras. Other example pump room devices may also exist. In one instance, each of the two or more pump room devices may be a different type of pump room device.

Generally, the data received at block 202 may be any type of analog data or digital data that is received from a device in a fire pump room. In an example in which one of the pump room devices is a fire pump controller, the fire pump controller may be configured to provide data that is indicative of one or more of a: fire pump engine status, manual/automatic status, fire pump water pressure, jockey pump water pressure, power available, pump running, remote start, deluge open, phase failure, interlock on, motor overload, automatic shutdown disabled, overvoltage, alarm, system pressure low, transfer switch normal, transfer switch emergency, phase reversal, fail to start, emergency isolation switch off, undervoltage, or other status.

In an example in which one of the pump room devices is a diesel engine, the diesel engine may be configured to provide data that is representative of a status of the diesel engine. In an example in which one of the pump room devices is an instrument of a diesel engine, the instrument may be configured to provide data that is representative of a status of the diesel engine. For instance, the data may be representative of an engine speed, oil pressure, exhaust temperature, etc.

In an example in which one of the pump room devices is a pressure sensor, the received data may be data indicative of a water pressure in a fire protection system. For example, a pressure sensor may be positioned in a water system to generate signals as a function of a suction pressure at the inlet of the pump, a discharge pressure at the outlet of a pump, an overall system pressure, or other water pressure. The pressure sensor may be any kind of pressure sensor that may measure any type of pressure, such as an absolute pressure, a gauge pressure, a differential pressure, or a sealed pressure, for example. In one instance, the data from the pressure sensor may provide redundancy for a water pressure that may also be received from a fire pump controller or jockey pump controller.

At block 204, the method 200 includes identifying one or more subscribing parties based on subscription information of a subscription database. In one example, subscription information for the one or more subscribing parties may be stored in a subscription database. Subscription information for a given subscribing party may include, for example, one or more of an identification of the subscribing party, a communication type (e.g., Ethernet, wireless via Wi-Fi cloud service, etc.), and a notification frequency (e.g., how often to provide data). In one instance, a computing device may access the subscription database to identifying one or more subscribing parties that are currently subscribed to receive data associated with devices in the fire pump room.

At block 206, the method 200 includes providing an indication of the received data to at least one of the identified subscribing parties via a wireless network interface controller that is communicatively coupled to a server in a network. In one example, information about the two or more pump room devices in the fire pump room may be provided to a private server in a network that is accessible by one or more subscribing parties. For instance, an indication of data that is received from each of the two or more pump room devices may be provided to the server in the network using a wireless network interface controller. The wireless network interface controller may be configured to provide the indication of data to a wired network such as the Internet, for example. In one scenario, a subscribing party may log-on to a website to access the provided data. In another scenario, a subscribing party may access a virtual private cloud where the provided data is stored using a virtual private network (VPN) connection.

Optionally, at block 208, the method 200 includes providing an indication of the received data to at least one of the identified subscribing parties via an Ethernet port communicatively coupled to an interface of a building management system. For example, the indication of the received data may be provided to a building management system according to BACNet, Profinet, or other communication protocol standards. In some examples, the method 200 may facilitate integrating a fire pump room with a building management system.

Within other examples of the method 200, data from a register of at least one of the pump room devices may be requested based on a preferred Modbus register list. For example, if data from a particular pump room device is received via a Modbus communication port, the preferred Modbus register list may identify an address of a particular Modbus register for the particular pump room device. The method 200 may then further include requesting data from the particular Modbus register of the particular pump room device.

In a further example of the method 200, data that is received from the particular Modbus register of the particular pump room device may be processed based on a conversion factor associated with the particular register. For instance, data that is received from the particular Modbus register may be scaled or otherwise converted so that the processed data is displayed according to a specific engineering unit (e.g., a unit of pressure, a unit of temperature, etc.). The method 200 may then include providing the processed data to at least one identified subscribing party. Thus, in some examples, the indication of the received data at block 206 and/or block 208 may be the processed data.

In other examples, the method 200 may also facilitate adding a pump room device and naming the pump room device. For example, the method 200 may further include receiving an indication of a name of a given one of the two or more pump room devices and an indication of a corresponding input port which the given pump room device is coupled to. In some instances, when an indication of data that is received from the given pump room device is provided to at least one identified subscribing part, the indication of the received data may also include an indication of the name of the pump room device.

The method 200 may also include causing a graphical display to provide a visual indication of the received data. For instance, the graphical display may be a component of a system that is configured to perform the method 200. In another instance, the graphical display may be a component of a separate pump room device that is located in the vicinity of the fire pump room. Alternatively, the graphical display may be a component of a computing device that is not located in the vicinity of the fire pump room, such as a computing device of a building management system or other computing device outside of the fire pump room.

Figure 3:
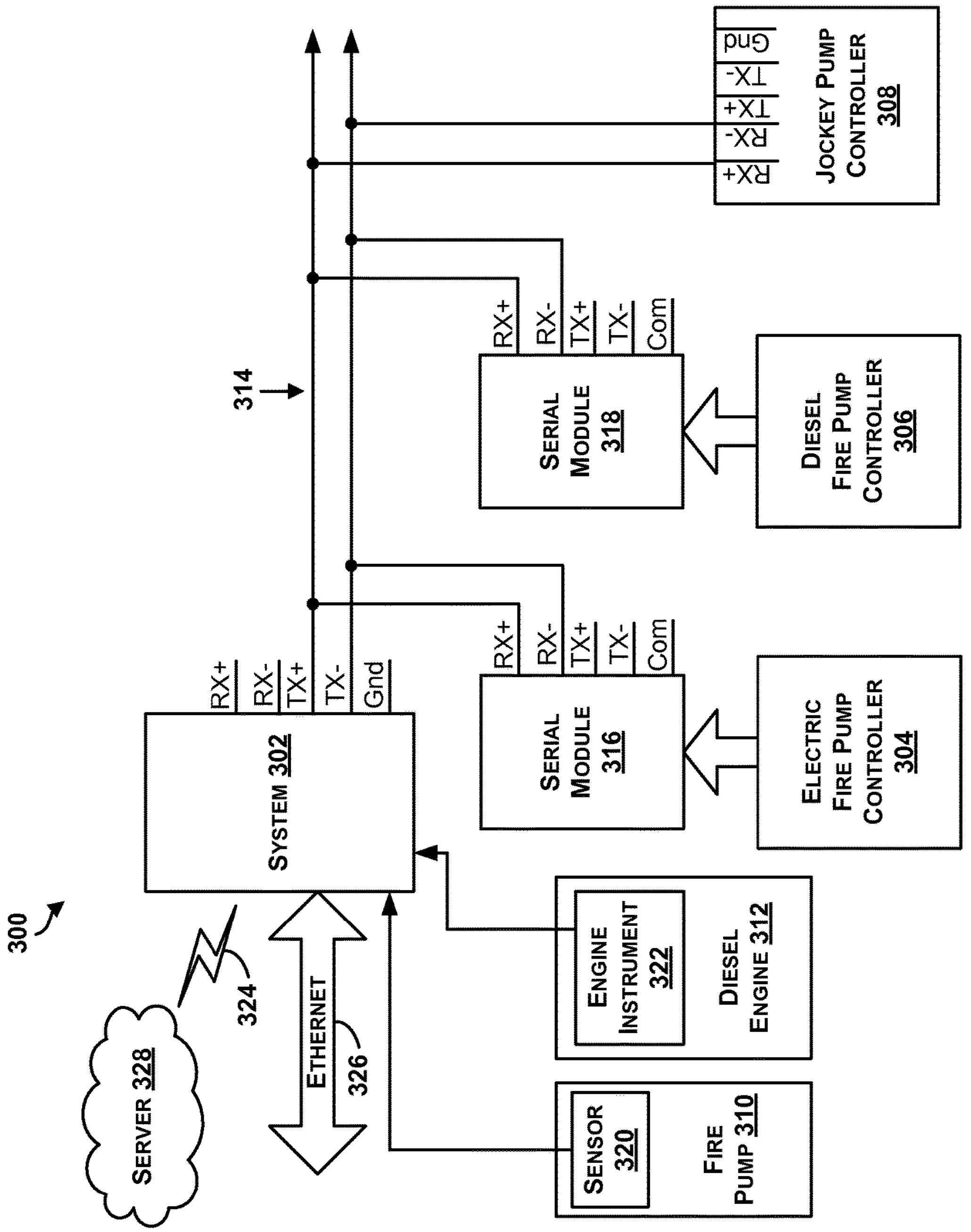
FIG. 3 is a block diagram of an example pump room network.

FIG. 3 is a block diagram of an example pump room network 300. The example pump room network 300 includes a system 302 that may be configured to gather information from devices in the pump room network 300 and provide the information to one or more external parties. The system 302 may be similar to the system 100 of FIG. 1 and may be configured to perform the method 200, for example.

As shown in FIG. 3, the example pump room network 300 also includes pump room devices such as an electric fire pump controller 304, a diesel fire pump controller 306, a jockey pump controller 308, a fire pump 310, and a diesel engine 312. Note that the example pump room network 300 is provided for purposes of example and explanation. Other pump room networks including more or less pump room devices may also exist. Therefore, the configuration of the example pump room network 300 should not be taken to be limiting.

Within the example pump room network 300, the system 302 may be configured to communicate with the electric fire pump controller 304, diesel fire pump controller 306, and jockey pump controller 308 using a Modbus over RS485 2-wire multi-drop communication link 314. For example, the system 302 may request and receive data from the electric fire pump controller 304 and diesel fire pump controller 306 over the communication link 314 by way of serial modules 316 and 318.

In the example pump room network 300 of FIG. 3, the serial modules 316 and 318 may be slave devices while the system 302 is a master device. Serial module 316 may be a communication interface that allows the electric fire pump controller to send data to the system 302 over the communication link 314 and serial module 318 may be a communication interface that allows the diesel fire pump controller 306 to send data to the system 302 over communication link 314. Additionally, the jockey pump controller 308 may be a slave device that is configured to communicate with the system 302 over the communication link 314.

The system 302 may also be configured to receive analog or digital signals from a fire pump pressure sensor 320 and an engine instrument 322. For instance, the fire pump pressure sensor 320 may be configured to output data that is indicative of a water pressure of the fire pump 310. Additionally, the engine instrument 322 may be configured to output data that is representative of a status of the diesel engine 312. In one instance, the engine instrument 322 may output data using a Modbus communication link.

FIG. 3 further illustrates a wireless link 324 and an Ethernet link 326 that the system 302 may utilize to provide an indication of data received from the pump room devices of the example pump room network 300. For example, the system 302 may provide an indication of received data to a server 328 in a private cloud via the wireless link 324. As another example, the system 302 may provide an indication of received data to a building management system or other computing device via the Ethernet link 326.

Figure 4:
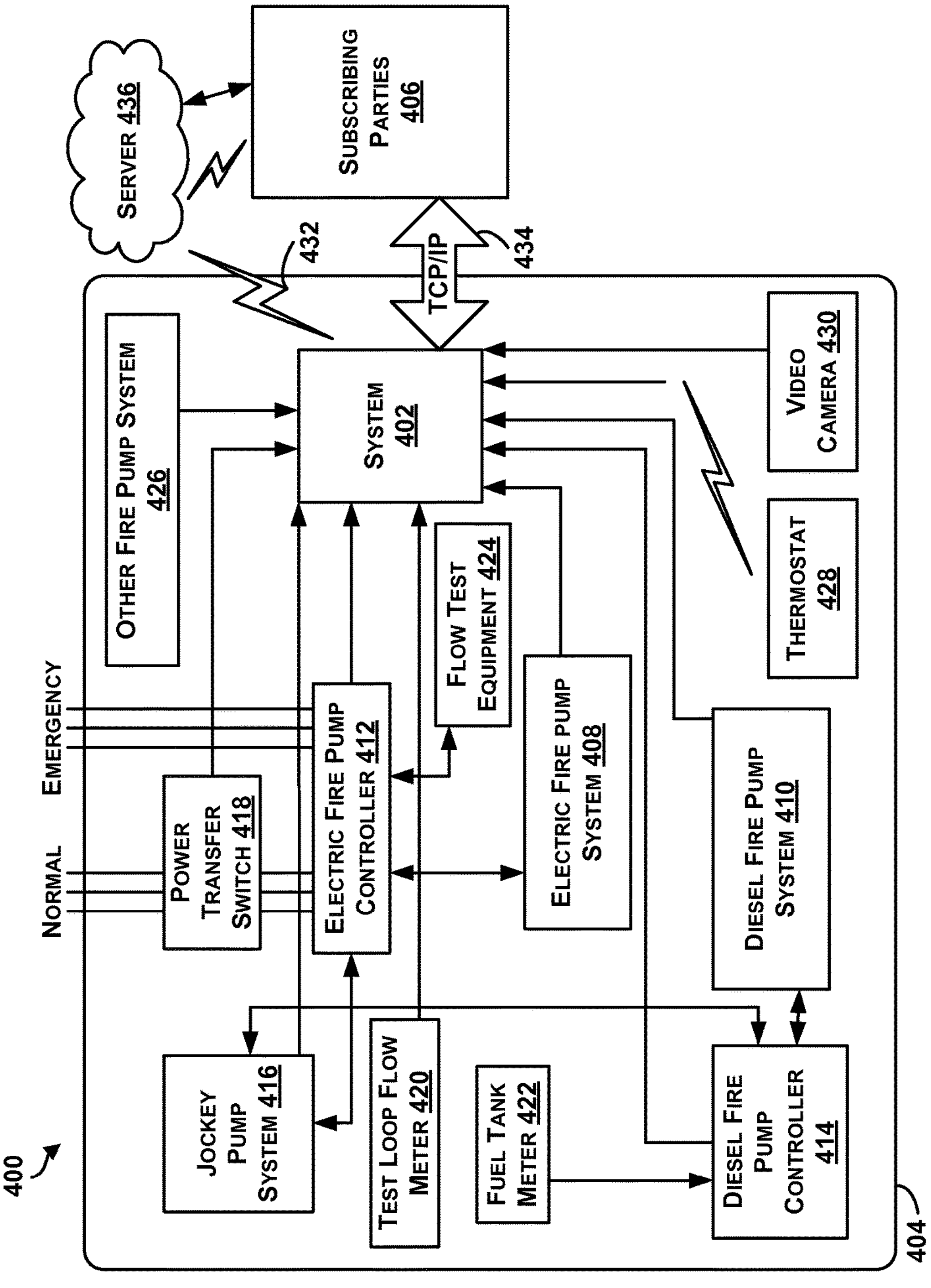
FIG. 4 is a block diagram of another example pump room network.

FIG. 4 is a block diagram of another example pump room network 400. The example pump room network 400 includes a system 402 that may be configured to gather information from devices in a fire pump room 404 and provide the information to one or more subscribing parties 406. The system 402 may be similar to the system 100 of FIG. 1 and may be configured to perform the method 200, for example.

As shown in FIG. 4, the example pump room network 400 also includes pump room devices such as electric fire pump system 408, diesel fire pump system 410, electric fire pump controller 412, diesel fire pump controller 414, jockey pump system 416, power transfer switch 418, test loop flow meter 420, fuel tank meter 422, flow test equipment 424, other fire pump system 426, thermostat 428, and video camera 430. The system 402 may be configured to communicate and receive data with any of the pump room devices of the fire pump 404.

For instance, the system 402 may receive data from one or more of the electric fire pump system 408, diesel fire pump system 410, electric fire pump controller 412, diesel fire pump controller 414, and jockey pump system 416 over a Modbus communication link. As another example, the system 402 may receive data from the power transfer switch 418 and the other fire pump system 426 via a discrete wiring communication link. In one instance, the other fire pump system 426 may be manufactured by a different manufacturer than the electric fire pump system 408. As another example, the system 402 may receive data from the thermostat 428 via a wireless and/or wired communication link. Similarly, the system 402 may receive data, such as a video feed for example, from the video camera 430.

FIG. 4 further illustrates a wireless link 432 and an Ethernet link 434 that the system 402 may utilize to provide an indication of data received from the pump room devices of the fire pump room 404 to the subscribing parties 406. The subscribing parties 406 may include, for example, building managers, fire pump controller maintenance employees, engine maintenance employees, fire protection system employees, security employees, insurance professionals, etc. In one example, the system 402 may provide an indication of received data to a server 436 in a private cloud via the wireless link 432. In another example, the system 402 may provide an indication of received data to a building management system or other computing device via the Ethernet link 434.

FIGS. 5A-5D conceptually illustrate an example system interface 500. In some examples, the interface 500 may be used by an operator to configure a system, such as the system 100 of FIG. 1, or select a course of action for the system. The interface 500 may be coupled to the system 100 of FIG. 1, for example. The interface 500 may include an electronic control board 502 having a display 504 and a keypad 506.

In one example, the display 504 may be a backlit, light emitting diode (LED) display. For example, the display 504 may be a monochrome or multi-chromatic dot matrix 128×64 LED display. Other example sizes are also possible. The display 504 may be configured to display customized graphics and/or characters.

The keypad 506 may enable a user or operator to access, modify, or input information. For instance, the keypad 506 may be used to navigate a graphical user interface including a home menu and multiple submenus. The keypad may include any type of keypad such as a silicone rubber keypad or touchscreen keypad.

Figure 5A:
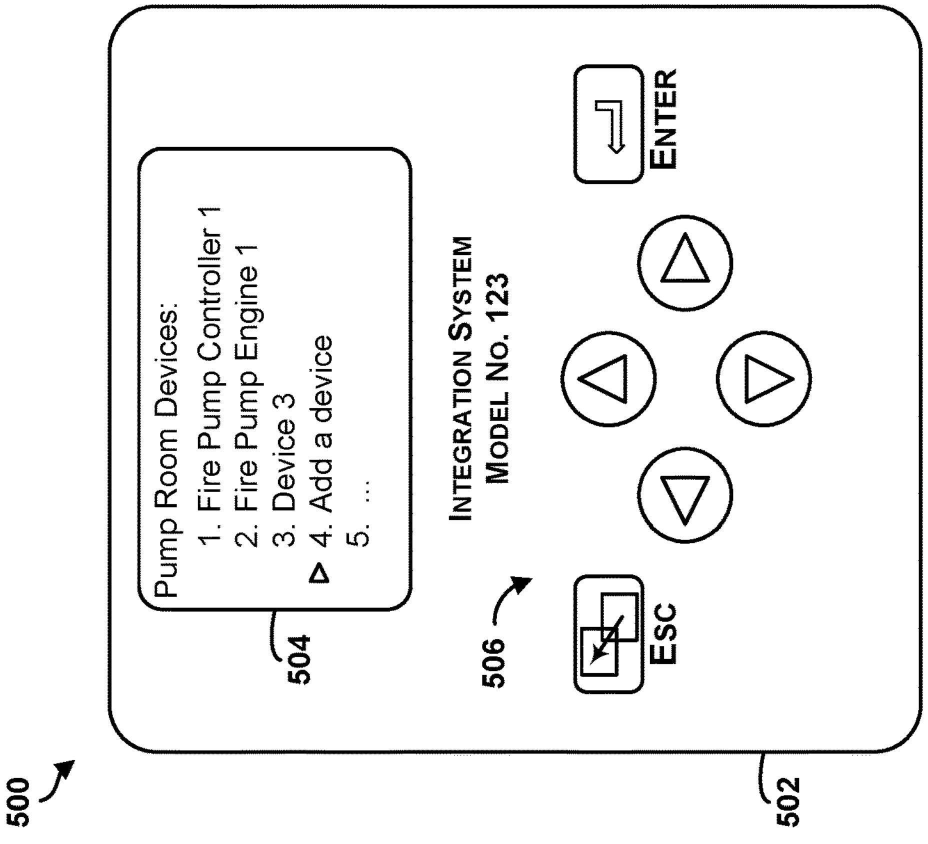
FIGS. 5A-5D conceptually illustrate an example system interface.
Figure 5B:
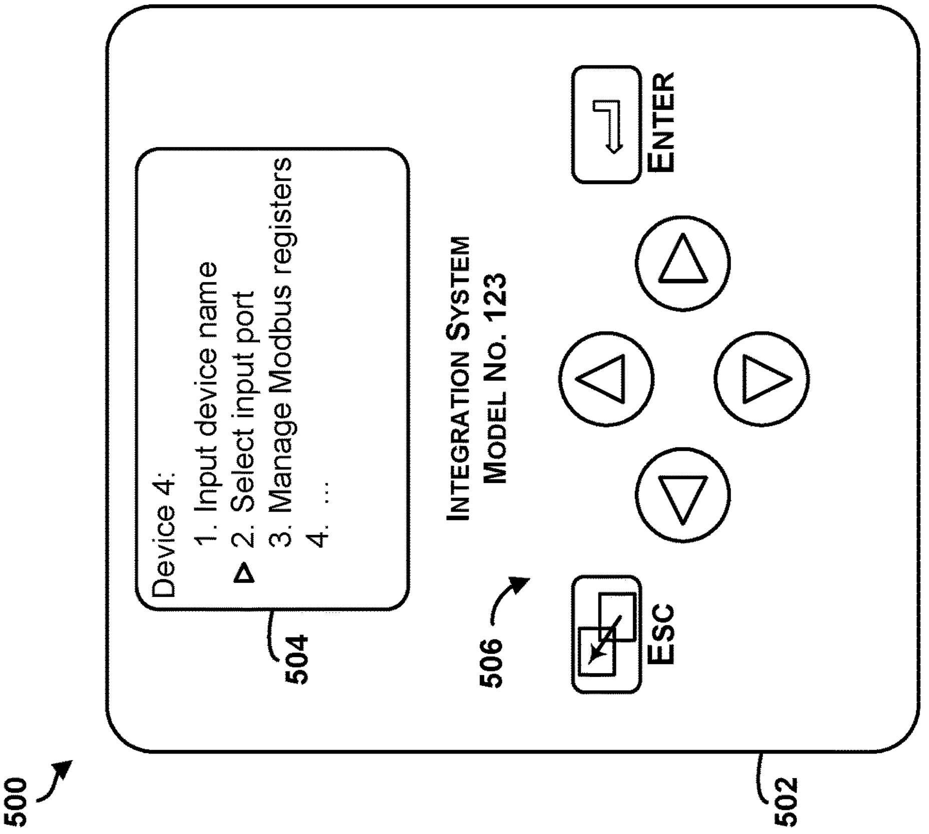

As shown in FIGS. 5A and 5B, in one example, an operator may use the interface 500 to add a pump room device and name the pump room device. For instance, the operator may navigate a list of pump room devices, such as the list shown on the display 504 in FIG. 5A, using the keypad 506 and select an option to add a pump room device. FIG. 5B illustrates an example submenu that may be provided on the display 504 in response to a request to add a pump room device. The operator may then provide an indication of a device name, select a corresponding input port for the pump room device, and/or manage Modbus registers for the pump room device using the interface 500.

Figure 5C:
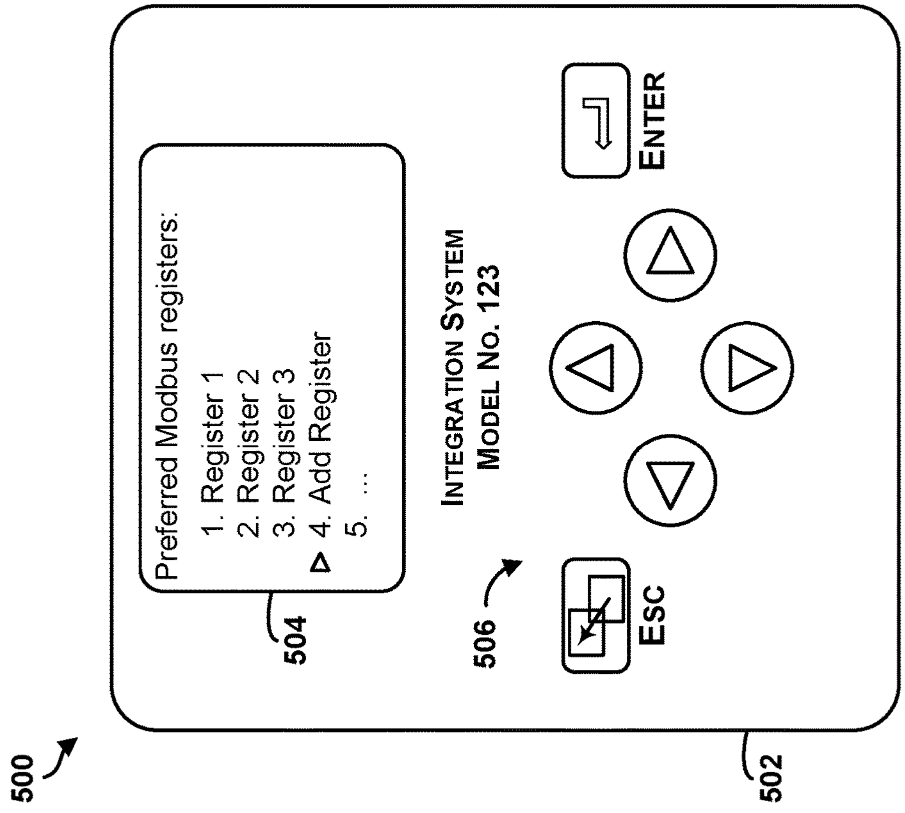
Figure 5D:
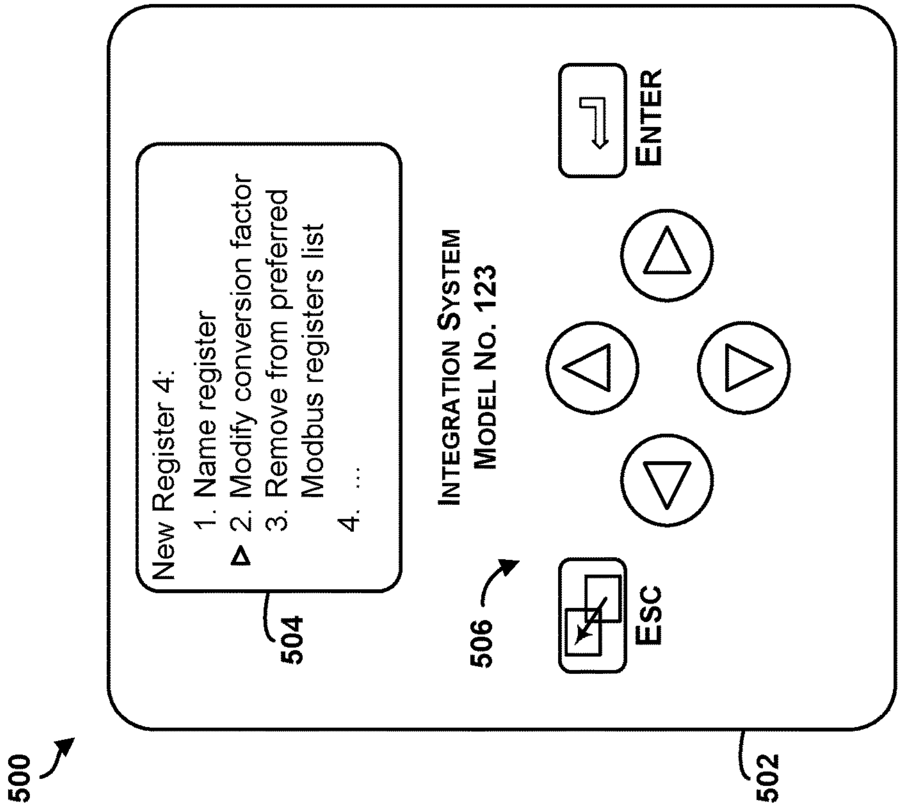

As shown in FIGS. 5C and 5D, in one example, an operator may use the interface 500 to add a Modbus register to a preferred Modbus register list and name the Modbus register. For instance, the operator may navigate a list of preferred Modbus registers, such as the list shown on the display 504 in FIG. 5C, using the keypad 506. The operator may also select an option to add a register using the keypad 506. FIG. 5D illustrates an example submenu that may be provided on the display 504 in response to a request to add a register to a list of preferred Modbus registers. The operator may then name the register and modify a conversion factor associated with data stored in the register. For example, the operator may provide an indication of a numerical scaling factor for data that is received from the register to be multiplied by in order to convert the data to a desired engineering unit.

Figure 6:
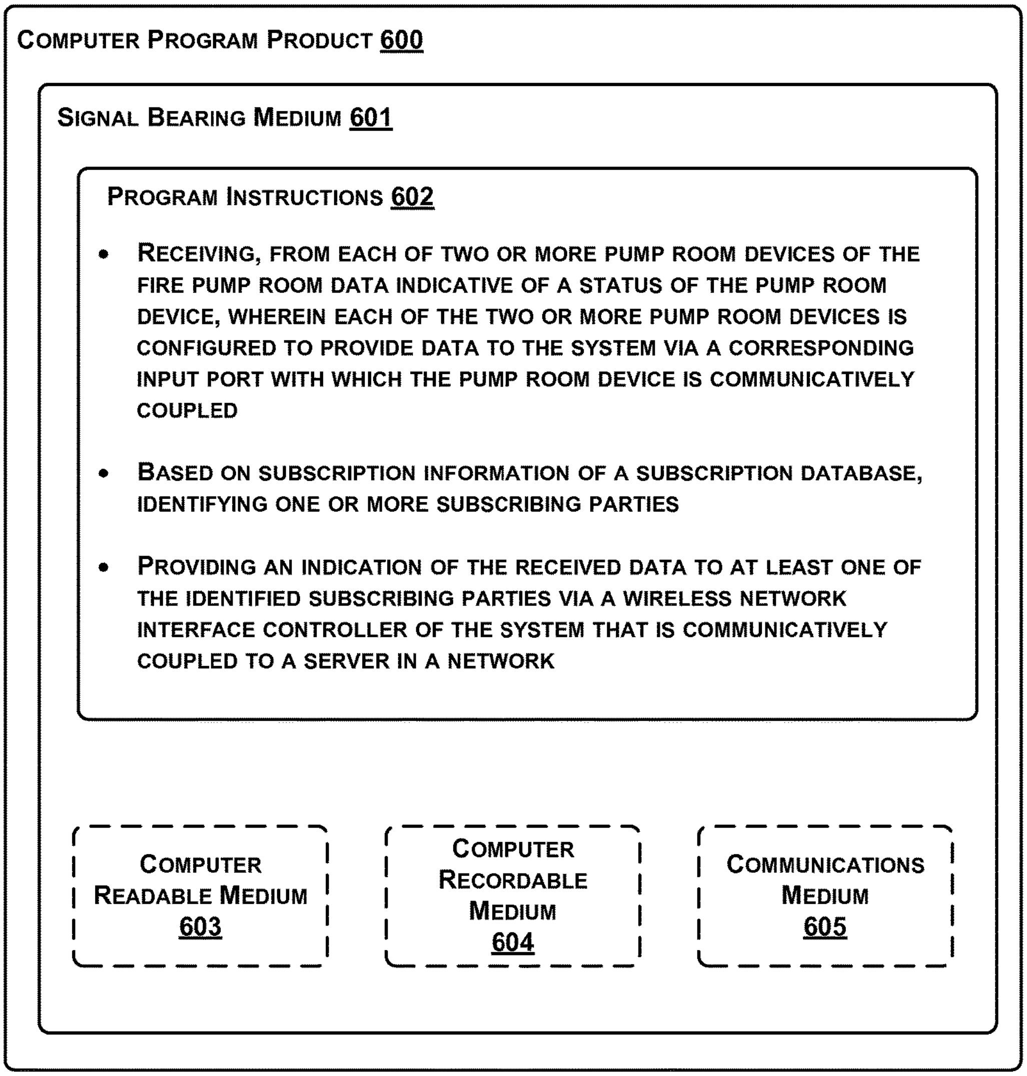
FIG. 6 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the system 100 of FIG. 1 may be configured to provide various operations, functions, or actions in response to the programming instructions 602 conveyed to the system 100 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system in a fire pump room, comprising:

a monitoring component configured to receive data from two or more pump room devices of the fire pump room, wherein the monitoring component comprises a plurality of input ports and each of the two or more pump room devices is communicatively coupled to the monitoring component via a corresponding input port, wherein the two or more pump room devices include an electric fire pump system, a diesel fire pump system, an electric fire pump controller, a diesel fire pump controller, a jockey pump system, a power transfer switch, a fuel tank meter, and flow test equipment, wherein the fuel tank meter outputs to the diesel fire pump controller and the flow test equipment outputs to the electric fire pump controller;

a wireless network interface controller communicatively coupled to a server in a network via a wireless access point;

an Ethernet port communicatively coupled to an interface of a building management system;

a memory configured to store subscription information for subscribing parties, wherein the subscription information indicates an identification of the subscribing parties and a respective notification frequency for the subscribing parties;

a first serial module coupled to the electric fire pump system and the electric fire pump controller;

a second serial module coupled to the diesel fire pump system and the diesel fire pump controller; and a processing component configured to receive data over a Modbus communication link from one or more of (i) the electric fire pump system and the electric fire pump controller via the first serial module and (ii) the diesel fire pump system and the diesel fire pump controller via the second serial module, and to receive data from the jockey pump system and the power transfer switch via a discrete wiring communication link, wherein the processing component is further configured to send an indication of the received data to the subscribing parties in accordance with the respective notification frequency via the wireless network interface controller and to control at least one of the two or more pump room devices of the fire pump room based on the received data, wherein the processing component is further configured to send the indication of the received data to at least one of the subscribing parties via the Ethernet port so as to integrate the fire pump room with the building management system.

2. The system of claim 1, wherein a given one of the plurality of input ports comprises a pressure port configured to receive, from a pressure sensor of the fire pump room, data representative of a water pressure in a fire protection system.

3. The system of claim 1, wherein a given one of the plurality of input ports comprises an engine sensor port configured to receive, from an instrument of a diesel engine, data representative of a status of the diesel engine.

4. The system of claim 1, wherein a given one of the plurality of input ports comprises a Modbus communication port.

5. The system of claim 1, wherein the two or more pump room devices comprise one or more of a diesel engine, an electric motor, a battery backup system, a thermostat, and a video camera.

6. The system of claim 1, further comprising a display having a graphical user interface.

7. The system of claim 6:

wherein the graphical user interface is configured to receive an indication of (i) a name of a given one of the two or more pump room devices and (ii) a corresponding input port which the given pump room device is coupled to, and wherein the indication of the received data further comprises an indication of (i) data that is received from the given pump room device and (ii) the name of the given pump room device.

8. A system in a fire pump room, comprising:

a monitoring component configured to receive data from two or more pump room devices of the fire pump room, wherein the monitoring component comprises a plurality of input ports and each of the two or more pump room devices is communicatively coupled to the monitoring component via a corresponding input port, wherein the two or more pump room devices include an electric fire pump system, a diesel fire pump system, an electric fire pump controller, a diesel fire pump controller, a jockey pump system, a power transfer switch, a fuel tank meter, and flow test equipment, wherein the fuel tank meter outputs to the diesel fire pump controller and the flow test equipment outputs to the electric fire pump controller;

a wireless network interface controller communicatively coupled to a server in a network via a wireless access point;

an Ethernet port communicatively coupled to an interface of a building management system;

a memory configured to store subscription information for subscribing parties, wherein the subscription information indicates an identification of the subscribing parties and a respective notification frequency for the subscribing parties;

a first serial module coupled to the electric fire pump system and the electric fire pump controller;

a second serial module coupled to the diesel fire pump system and the diesel fire pump controller; and a processing component configured to receive data over a Modbus communication link from one or more of (i) the electric fire pump system and the electric fire pump controller via the first serial module and (ii) the diesel fire pump system and the diesel fire pump controller via the second serial module, and to receive data from the jockey pump system and the power transfer switch via a discrete wiring communication link, wherein the processing component is further configured to send an indication of the received data to the subscribing parties in accordance with the respective notification frequency via the wireless network interface controller and to control at least one of the two or more pump room devices of the fire pump room based on the received data, wherein the processing component is further configured to send the indication of the received data to at least one of the subscribing parties via the Ethernet port so as to integrate the fire pump room with the building management system, wherein a given one of the plurality of input ports comprises a Modbus communication port, wherein the memory is further configured to store a preferred Modbus register list for at least one of the two or more pump room devices, and wherein the monitoring component is further configured to request data from one or more registers of the preferred Modbus register list.

9. A system in a fire pump room, comprising:

a monitoring component configured to receive data from two or more pump room devices of the fire pump room, wherein the monitoring component comprises a plurality of input ports and each of the two or more pump room devices is communicatively coupled to the monitoring component via a corresponding input port, wherein the two or more pump room devices include an electric fire pump system, a diesel fire pump system, an electric fire pump controller, a diesel fire pump controller, a jockey pump system, a power transfer switch, a fuel tank meter, and flow test equipment, wherein the fuel tank meter outputs to the diesel fire pump controller and the flow test equipment outputs to the electric fire pump controller;

a wireless network interface controller communicatively coupled to a server in a network via a wireless access point;

an Ethernet port communicatively coupled to an interface of a building management system;

a memory configured to store subscription information for subscribing parties, wherein the subscription information indicates an identification of the subscribing parties and a respective notification frequency for the subscribing parties;

a first serial module coupled to the electric fire pump system and the electric fire pump controller;

a second serial module coupled to the diesel fire pump system and the diesel fire pump controller; and a processing component configured to receive data over a Modbus communication link from one or more of (i) the electric fire pump system and the electric fire pump controller via the first serial module and (ii) the diesel fire pump system and the diesel fire pump controller via the second serial module, and to receive data from the jockey pump system and the power transfer switch via a discrete wiring communication link, wherein the processing component is further configured to send an indication of the received data to the subscribing parties in accordance with the respective notification frequency via the wireless network interface controller and to control at least one of the two or more pump room devices of the fire pump room based on the received data, wherein the processing component is further configured to send the indication of the received data to at least one of the subscribing parties via the Ethernet port so as to integrate the fire pump room with the building management system, wherein the memory is further configured to store a preferred Modbus register list for at least one of the two or more pump room devices, and wherein the monitoring component is further configured to request data from a register of the preferred Modbus register list.

10. The system of claim 9, further comprising a Modbus communication port.

11. The system of claim 9, wherein the processing component is further configured to process data received from the register based on a conversion factor associated with the register, and wherein the indication of the received data comprises the processed data.

12. The system of claim 9, wherein a given one of the plurality of input ports comprises a pressure port configured to receive, from a pressure sensor of the fire pump room, data representative of a water pressure in a fire protection system.

13. The system of claim 9, wherein a given one of the plurality of input ports comprises an engine sensor port configured to receive, from an instrument of a diesel engine, data representative of a status of the diesel engine.

14. The system of claim 9, wherein the two or more pump room devices comprise one or more of a diesel engine, an electric motor, a battery backup system, a thermostat, and a video camera.

15. The system of claim 9, further comprising a display having a graphical user interface.

16. The system of claim 15, wherein the graphical user interface is configured to receive an indication of (i) a name of a given one of the two or more pump room devices and (ii) a corresponding input port which the given pump room device is coupled to, and wherein the indication of the received data further comprises an indication of (i) data that is received from the given pump room device and (ii) the name of the given pump room device.

* * * * *